Nov. 28, 1961 M. I. GLASS 3,010,227
TOY
Filed April 30, 1959
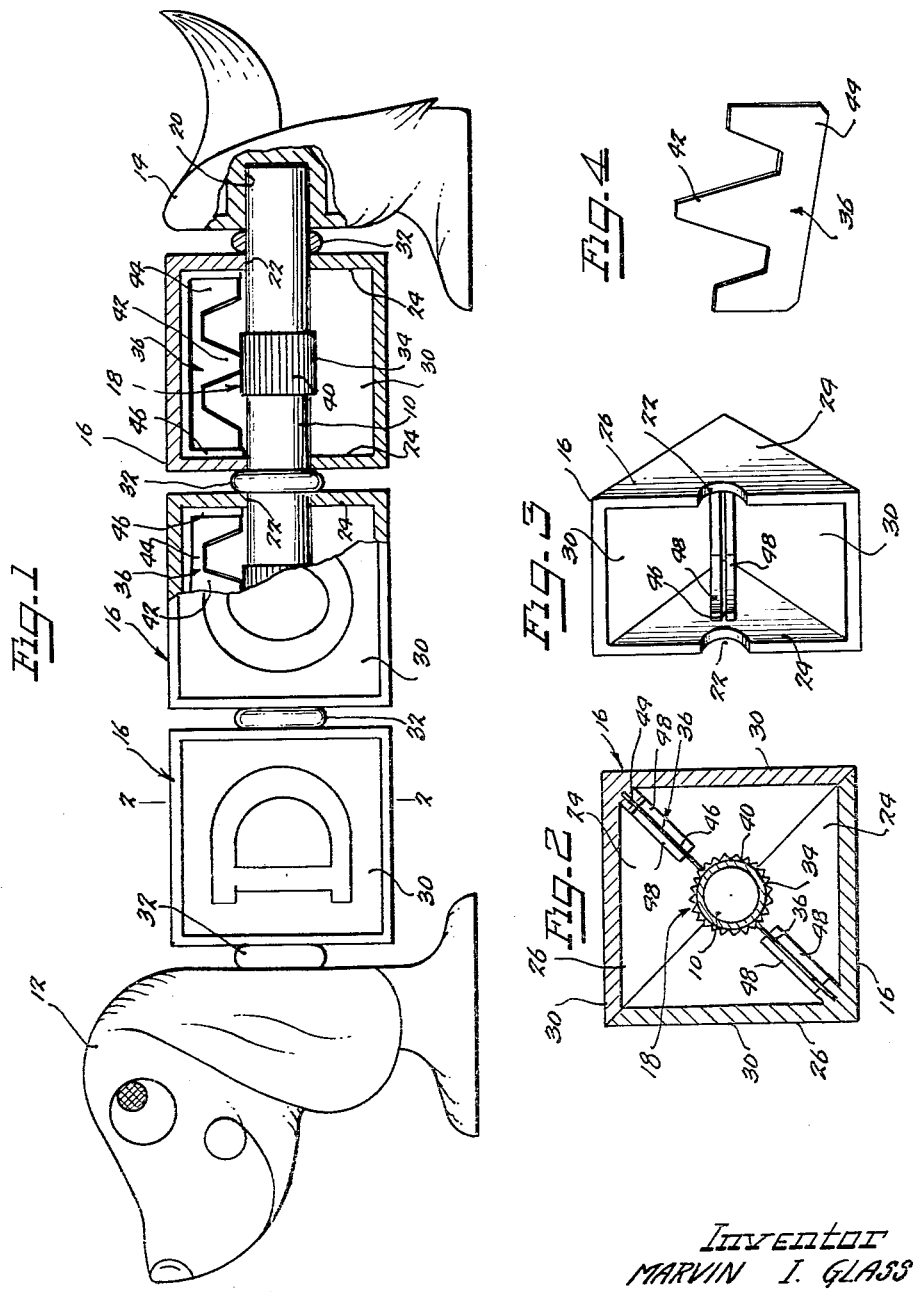
Inventor
MARVIN I. GLASS
By Soans, Anderson, Luedeka & Fitch
Atty's

United States Patent Office 3,010,227
Patented Nov. 28, 1961

3,010,227
TOY
Marvin I. Glass, 57 E. Ohio St., Chicago, Ill.
Filed Apr. 30, 1959, Ser. No. 809,973
2 Claims. (Cl. 35—69)

The present invention relates to a toy and more particularly to an educational toy on which a child may practice his spelling of certain words in a novel manner.

An object of the present invention is the provision of an educational toy which maintains the interest of a young child over an extended period of time. Another object of the invention is the provision of an educational toy which simulates an animal and produces a sound associated with the simulated animal as the child spells certain words thereon. A further object is the provision of an educational toy which is durable and inexpensive to manufacture.

Other objects and advantages of the present invention will become apparent by reference to the following description and accompanying drawings.

In the drawings:

FIGURE 1 is an elevational view of an educational toy embodying various features of the present invention, portions of the toy being broken away to show the internal construction thereof;

FIGURE 2 is a transverse sectional view taken generally along line 2—2 of FIGURE 1;

FIGURE 3 is a perspective view of a section of one of the alphabet blocks shown in FIGURE 1;

FIGURE 4 is a perspective view of a part of the sound producing means which is disposed within each of the alphabet blocks shown in FIGURE 1.

The educational toy shown in the drawings comprises a shaft 10 which is supported at its ends by means 12 and 14 simulating respectively the fore and hind portions of an animal. A plurality of alphabet blocks 16 are rotatably mounted on the shaft 10, the blocks 16 having sound producing means 18 therein for producing a sound when the blocks are rotated.

More specifically, the educational toy shown in the drawings includes an elongated tubular shaft 10 of a generally hard material such as plastic, wood, etc. The ends of the shaft 10 are mounted in recesses 20 in the supporting means 12 and 14. In order to retain the interest of a child in the educational toy, the supporting means 12 and 14 are formed to simulate respectively the fore and hind quarters of a dog, the shaft 10 forming the body of the dog. The supporting means 12 and 14 are made of material which can withstand the use that a toy of this type is subjected to such as plastic, wood, metal, etc., and, for convenience of manufacture, each supporting means may be formed by two interconnected half-sections.

In the illustrated embodiment, three hollow cubical blocks 16 are rotatably mounted on the shaft 10, the shaft 10 extending through apertures 22 in the transversely extending endwalls 24 of the blocks 16. The blocks 16 may be made of plastic, wood, metal, etc., and for convenience of assembly, each block 16 in the illustrated embodiment is formed of two interconnected right triangular prisms 26. The sidewalls 30 of the blocks 16, which extend generally parallel to the axis of the shaft 10, are preferably inscribed with different letters of the alphabet so that various three-letter words may be formed by rotating the blocks 16 relative to each other.

The blocks 16 are prevented from moving axially along the shaft by washers 32 fixedly mounted to the shaft 10 between the blocks 16 and between the supports 12 and 14 and the blocks 16.

To add to the fascination of the educational toy, each block 16 is provided with a noise producing means 18 that produces a sound when the block 16 is rotated. The sound producing means 18 include a knurled portion 34 of the shaft 10 located within each block 16, and a pair of plates or vibrators 36 slidably disposed within each block 16 and adapted to be vibrated by the knurled portion 34 when the block 16 is rotated relative to the shaft 10. While for the best quality of sound the knurled portion 34 includes a plurality of teeth 40 equally spaced around the shaft 10, as shown in FIGURE 2, the knurled portion 34 may be any irregular surface which properly vibrates the vibrator 36. For convenience of manufacture, the shaft 10 and washers 32 may be formed by two interconnected half-sections.

In the illustrated embodiment, each vibrator 36 is formed from a flat piece of sheet metal such as brass and includes a truncated triangular central tongue portion 42 which extends from a generally U-shaped base portion 44. Each vibrator 36 is slidably disposed in a pair of oppositely disposed guideways 46 located on the inside surfaces of the transversely extending endwalls 24 of the block 16. The guideways 46 are positioned so that the vibrator 36 lies in a plane which includes the shaft 10. In the illustrated embodiment, each guideway 46 is formed by a pair of spaced apart parallel ribs 48 attached to the endwall 24 of the block 16 in such a way that each vibrator 36 bisects the right angle of the associate prism 26 forming one half of the block 16.

When the block 16 is rotated, the end of the tongue portion 42 is vibrated by the knurled portion 34, thereby producing a noise simulating a dog's growl. Disposing the vibrator 36 in guideways 46 within the hollow block 16, as described above, enables the base portion 44 to act in cooperation with the tongue 42 to improve the quality of the sound.

It is believed that the improved sound results from the fact that the vibrator 36, since it is not rigidly held in place at its marginal edges, is free to flex along the axis of the tongue portion 42 and at the same time is free to flex transversely of the tongue portion 42 (along an axis parallel to the shaft 10). Thus, the construction employed makes for ease of assembly and provides an improved sound. This sound is further enhanced by the walls 24 and 30 of the hollow block 16 which define a sounding chamber.

Preferably, the tongue portion 42 is made of such a length that the end thereof extends between two of the teeth 40 of the knurled portion 34 approximately to the full working depth of the teeth 40. In this way the vibrator 36 acts as a detent to prevent inadvertent rotation of the block 16 in either direction.

While the educational toy described above simulates a dog, it should be realized that other animals may be simulated, such as a cat, tiger, etc.

Various changes may be made in the above described educational toy without departing from the spirit or scope of the invention. Various of the features of the invention are set forth in the accompanying claims.

I claim:

1. In a toy of the class described, a sound producing means comprising a shaft, a hollow block formed of two interconnected right triangular prisms rotatably mounted on said shaft with the end walls of the block extending generally transverse of the shaft, the walls of said block defining a sounding chamber, a pair of oppositely disposed guideways disposed on the inside surfaces of the end walls, and a plate of flexible material slidably disposed in said guideways, the guideways being located so that the plate lies in a plane which bisects the right angle of one of said prisms, said shaft being provided with a knurled portion which engages said plate so as to produce a sound when the block is rotated relative to the shaft.

2. A toy comprising a shaft, a support member simulating the fore quarter of a dog connected to one end of said shaft, a second support member simulating the hind quarter of the same dog connected to the other end of said shaft, a plurality of hollow alphabet blocks rotatably mounted on said shaft, a plurality of spacers fixedly mounted to said shaft between said blocks and said support members, and a sound producing means within each block, said sound producing means including a gear disposed on said shaft and at least one vibrator retained within the block, said vibrator being of such a length as to engage the gear sufficiently to prevent undesirable rotation of the blocks and also to produce a sound simulating a dog's growl when each block is rotated.

References Cited in the file of this patent

UNITED STATES PATENTS

| | | |
|---|---|---|
| 853,756 | Betis | May 14, 1907 |
| 1,194,216 | Morse | Aug. 8, 1916 |
| 1,561,884 | Pohlson | Nov. 17, 1925 |
| 2,035,308 | Ferber | Mar. 24, 1936 |
| 2,667,738 | Eichholz | Feb. 2, 1954 |
| 2,680,306 | Moyer | June 8, 1954 |
| 2,708,809 | Peterson | May 24, 1955 |
| 2,823,490 | Griem | Feb. 18, 1958 |
| 2,853,826 | Romeo | Sept. 30, 1958 |

FOREIGN PATENTS

| | | |
|---|---|---|
| 592,288 | Great Britain | Sept. 12, 1947 |